United States Patent [19]
Lee

[11] Patent Number: 5,737,295
[45] Date of Patent: Apr. 7, 1998

[54] DUAL-FOCUS OPTICAL PICKUP FOR DIFFERENT THICKNESSES OF RECORDING MEDIUM

[75] Inventor: Chul-woo Lee, Seoul, Rep. of Korea

[73] Assignee: Samsung Electronics Co., Ltd., Suwon, Rep. of Korea

[21] Appl. No.: 585,252

[22] Filed: Dec. 26, 1995

[30] Foreign Application Priority Data

Jun. 26, 1995 [KR] Rep. of Korea ............. 95-17596

[51] Int. Cl.$^6$ .................................................. G11B 7/09
[52] U.S. Cl. .................. 369/103; 369/44.37; 369/109; 369/94
[58] Field of Search .................. 369/103, 112, 369/44.23, 44.38, 94, 109, 286, 110, 44.37

[56] References Cited

U.S. PATENT DOCUMENTS

| | | | |
|---|---|---|---|
| 3,913,076 | 10/1975 | Lehureau | 369/44.24 |
| 3,971,002 | 7/1976 | Bricot et al. | 369/44.24 |
| 5,446,565 | 8/1995 | Komma et al. | 369/112 |
| 5,446,723 | 8/1995 | Best et al. | 369/94 |
| 5,526,336 | 6/1996 | Park et al. | 369/112 |
| 5,563,873 | 10/1996 | Ito et al. | 369/286 |

FOREIGN PATENT DOCUMENTS

| | | |
|---|---|---|
| 63-200328 | 8/1988 | Japan. |
| 64-27043 | 1/1989 | Japan. |
| 3-173942 | 7/1991 | Japan. |
| 3-250437 | 11/1991 | Japan. |
| 4-339330 | 11/1992 | Japan. |
| 5-6546 | 1/1993 | Japan. |
| 7-98431 | 4/1995 | Japan. |
| 7-302437 | 11/1995 | Japan. |

OTHER PUBLICATIONS

Y. Komma et al., "Dual Focus Optical Head for 0.6 mm and 1.2 mm Disks," *Optical Review*, vol. 1, No. 1 (1994), pp. 27–29.

*Primary Examiner*—David C. Nelms
*Assistant Examiner*—Kim-Kwok Chu
*Attorney, Agent, or Firm*—Burns, Doane, Swecker & Mathis, L.L.P.

[57] ABSTRACT

A dual-focus optical pickup for both 0.6 mm and 1.2 mm disks utilizes a hologram lens for diffracting a generated laser light beam into ±1st order light beams and an objective lens for focusing the diffracted light beams onto the disks, for increasing light efficiency and being less sensitive to optical axis variations. Since the ±1st order light beams are used simultaneously, light efficiency is not lowered. Also, since a simplified protrusion- and depression-shaped hologram pattern is used, the device is easy to manufacture and assemble, and exhibits stable optical performance, even under changing optical axis conditions.

3 Claims, 5 Drawing Sheets

5,737,295

DUAL-FOCUS OPTICAL PICKUP FOR DIFFERENT THICKNESSES OF RECORDING MEDIUM

BACKGROUND OF THE INVENTION

The present invention relates to a dual-focus optical pickup for recording or reproducing information optically, and more particularly, to a dual-focus optical pickup for forming a focused beam spot on the recording planes of disks having different thicknesses.

As an optical recording medium, a well-known compact disk has a substrate thickness of 1.2 mm, with 0.6 mm disks having been recently developed for high-density recording. In order to read the information stored at high density, the size of a focused optical spot should be reduced. For this purpose, it is necessary to use a short-wavelength light source and an objective lens having a large numerical aperture.

However, since an objective lens having a large numerical aperture is extremely unstable, causing aberration when the disk is tilted, the disk's slope must be tightly controlled during reproduction. This aberration increases in proportion to the thickness and slope of the disk substrate. Therefore, a slope error tolerance can be increased by making the substrate as thin as possible, thereby realizing practical high-density reproduction. With the advent of disks of varying thickness, compatible optical pickup is required for the various kinds (different thicknesses) of disks.

FIG. 1 shows a conventional dual-focus optical pickup for 0.6 mm disks and 1.2 mm disks, by which spherical aberration caused by different disk thicknesses is compensated for. Here, a reference numeral 1 is a 0.6 mm disk and reference numeral 2 is a 1.2 mm disk, with one or the other disk being loaded into a disk drive (not shown).

Referring to FIG. 1, a conventional dual-focus optical pickup is constituted by a laser diode 3 for generating a laser light beam, a half mirror 4 for partially reflecting and partially transmitting the light beam, a collimating lens 5 for directing the reflected light beam as a collimated light toward the loaded disk 1 or 2, a hologram lens 6 for diffracting the collimated light, and an objective lens 9 for focusing the zero-order transmitted light beam 7 and 1st-order diffracted light beam 8 of hologram lens 6 onto disks 1 and 2, respectively. Also, a sensor lens 10 is provided for receiving the information-bearing reflected light beam of disk 1 or disk 2, to be detected by a photo-detector 11.

Generally, hologram lens 6 diffracts incident light into a +1st diffracted light beam and a −1st diffracted light beam, of one of these beams is not used, light efficiency is lowered considerably. In this context, the conventional art adopts a hologram lens which is blazed to prevent the diffraction of one or the other beams, i.e., either the +1st diffracted light beam or the −1st diffracted light beam. Utilizing the difference between the emitting angles of zero-order transmitted light beam 7 and 1st-order diffracted light beam 8 of hologram lens 6, 0.6 mm disk i is read using zero-order transmitted light beam 7, as shown in FIG. 2, and 1.2 mm disk 2 is read using 1st-order diffracted light beam 8, as shown in FIG. 3.

However, the blazed hologram lens is not easy to fabricate nor to adjust. Also, with such a lens incorporated into an optical pickup system, should the optical axis be slightly shifted or tilted during use, the diffraction characteristics vary greatly, which causes frequent errors.

SUMMARY OF THE INVENTION

To solve the above problems, it is therefore an object of the present invention to provide a dual-focus optical pickup which can increase light efficiency and is less sensitive to optical axis variations.

To accomplish the above object, there is provided a dual-focus optical pickup, having means for detecting a signal corresponding to light reflected from loaded disks having different thicknesses, for forming a light spot on the disks, the pickup comprising: a light source for generating light; a hologram lens for diffracting the generated light into ±1st order light beams; and an objective lens for focusing the ±1st order light beams of the hologram lens onto either disk.

BRIEF DESCRIPTION OF THE DRAWINGS

The above objects and advantages of the present invention will become more apparent by describing in detail a preferred embodiment thereof with reference to the attached drawings in which:

FIG. 4A is details of the hologram lens of FIG. 4;

DETAILED DESCRIPTION OF THE INVENTION

In the present invention, the zero-order transmitted light beam of the hologram lens is not used. Instead, a dual focus is formed using +1st order diffracted lights only.

Figure 1:
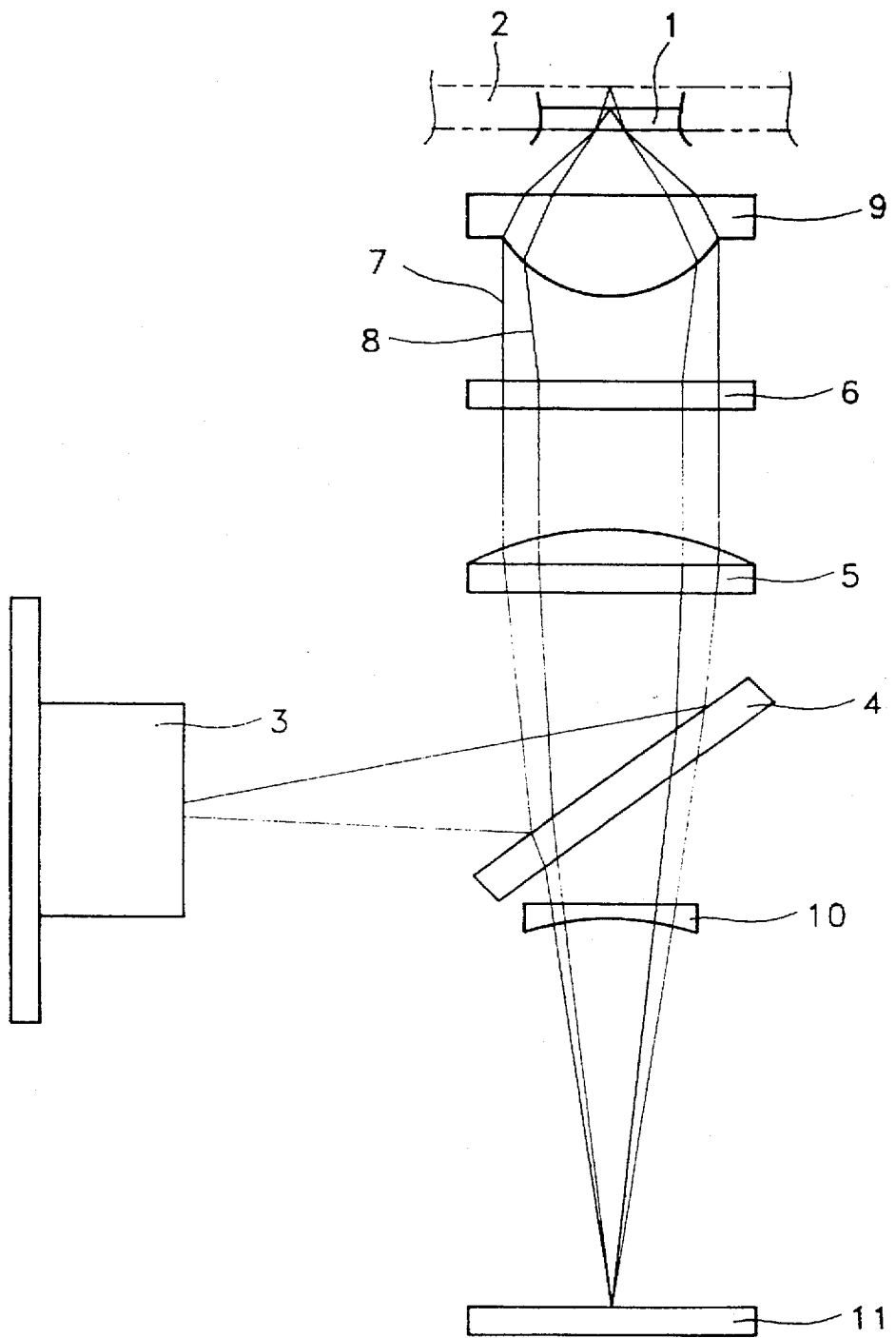
FIG. 1 is a schematic view showing the construction of a conventional dual-focus optical pickup.
Figure 2:
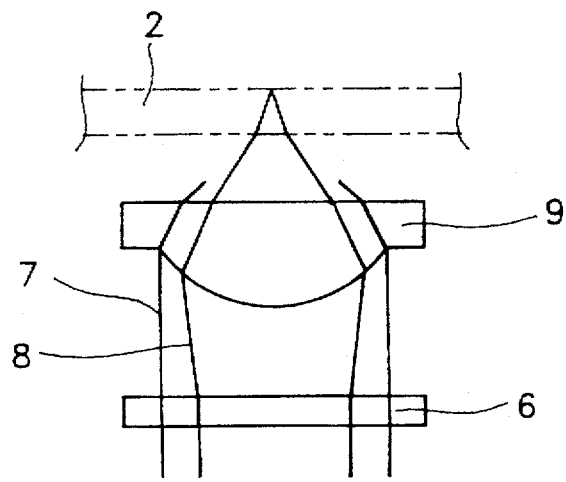
FIG. 2 shows the optical path for a 0.6 mm disk in the conventional dual-focus optical pickup.
Figure 3:
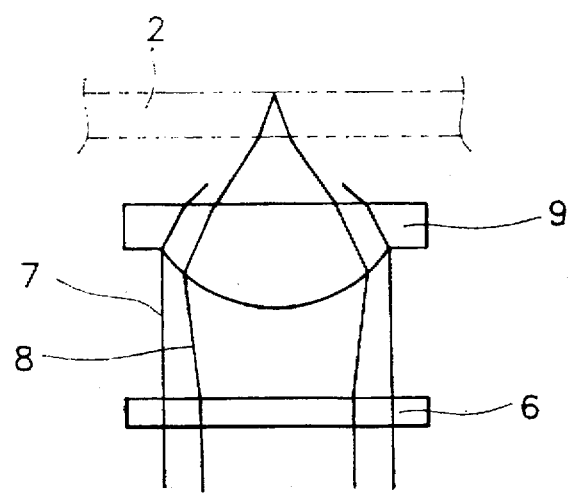
FIG. 3 shows the optical path for a 1.2 mm disk in the conventional dual-focus optical pickup.
Figure 4:
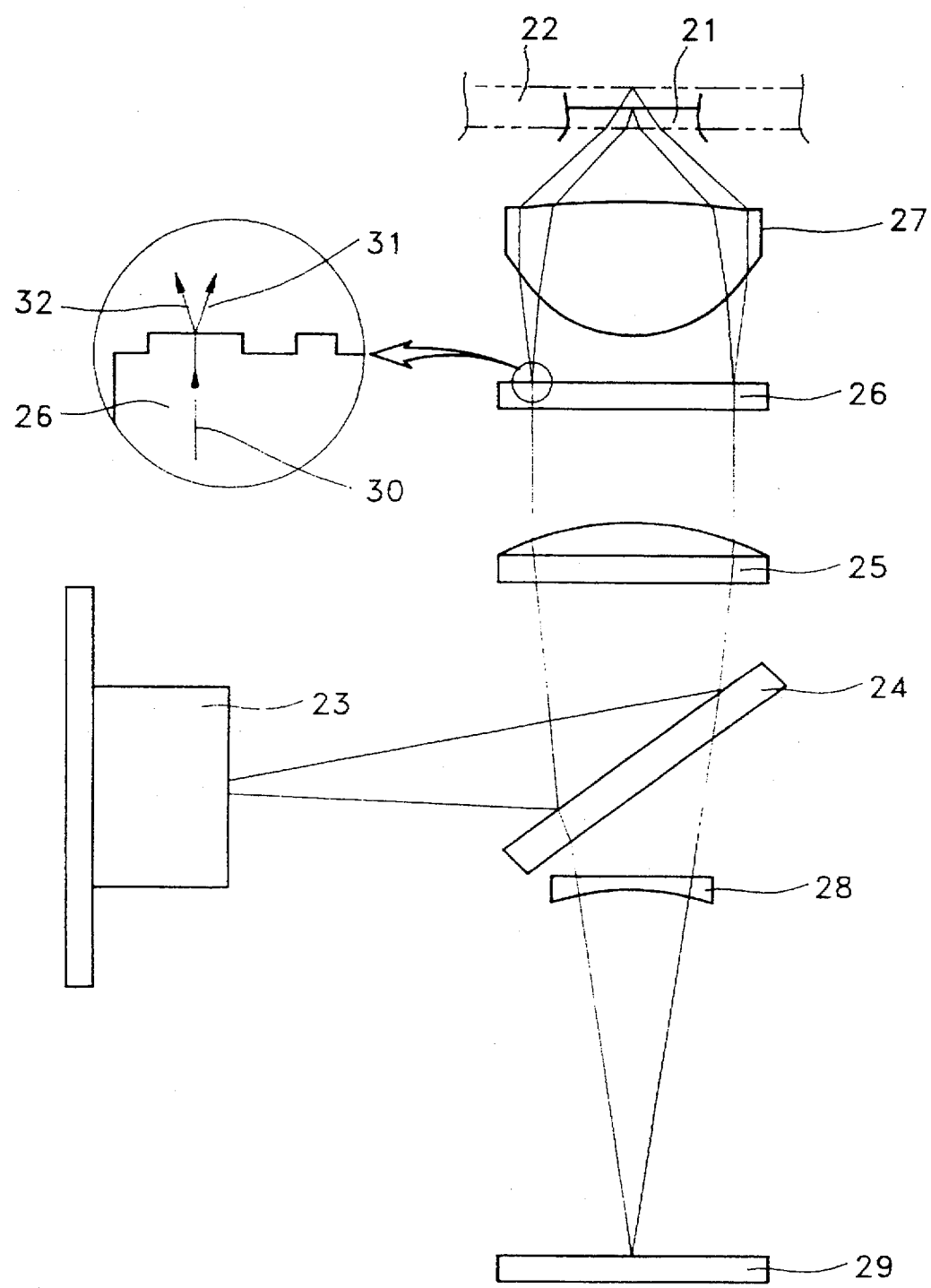
FIG. 4 is a schematic view showing the construction of an optical pickup having a dual-focus objective lens according to the present invention, wherein an enlarged view is provided for explaining the respective optical paths
Figure 5:
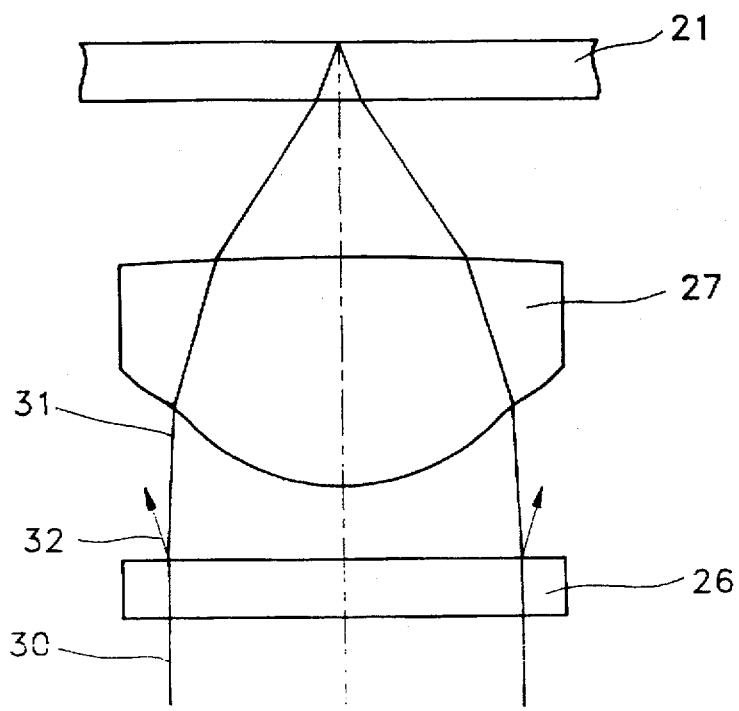
FIG. 5 shows the optical path for a 0.6 mm disk in the optical pickup of FIG. 4.
Figure 6:
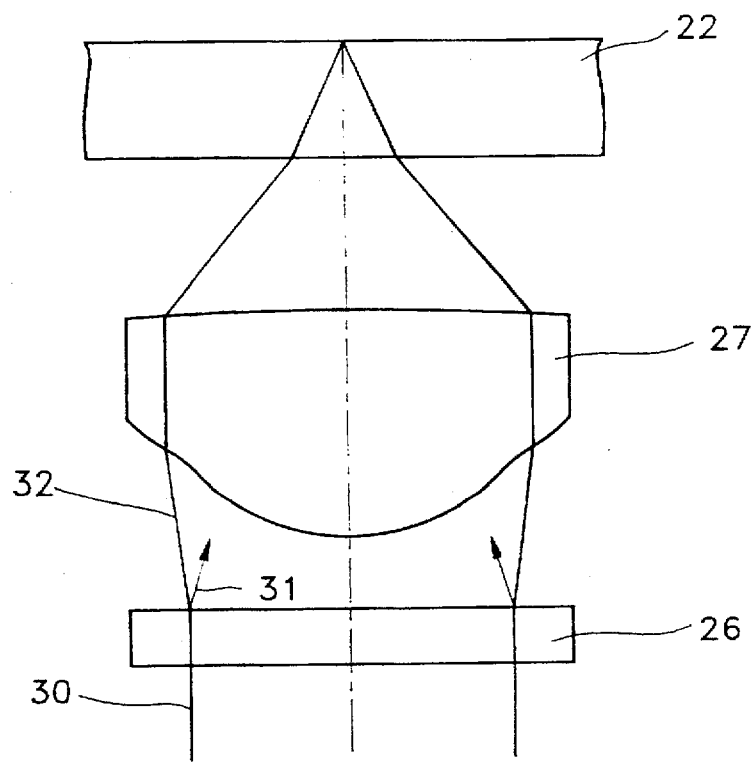
FIG. 6 shows the optical path for a 1.2 mm disk in the optical pickup of FIG. 4.

In FIG. 4, a reference numeral 21 indicates a 0.6 mm disk, and reference numeral 22 indicates a 1.2 mm disk. Either disk 21 or 22 is installed within a drive (not shown).

As shown in FIG. 4, the dual-focus optical pickup according to the present invention includes a laser diode 23 for generating laser light, a half mirror 24 for partially reflecting and partially transmitting light, a collimating lens 25 for making the reflected light from half mirror 24 parallel directing it toward disk 21 or 22, a hologram lens 26 for diffracting the collimated light, an objective lens 27 for focusing the diffracted light to form light spots on disks 21 and 22, respectively, and a sensor lens 28 and a photo-detector 29 which are disposed for detecting a signal from the reflected light from either disk.

In the optical pickup according to the present invention, hologram lens 26 having a protrusion- and depression-shaped hologram pattern (shown in the enlarged view of FIG. 4) diffracts the incident light 30 into a +1st-order convergent light beam 31 and a −1st-order divergent light beam 32. Then, objective lens 27 focuses the convergent light beam 31 onto the thinner disk 21 and focuses the divergent light beam 32 onto the thicker disk 22.

The following lens data are required for the design of hologram lens 26 and objective lens 27, with respect to 0.6 mm disks and 1.2 mm disks.

criteria for hologram lens 26
   thickness: 1 mm
   refractive index: 1.515
   object point of hologram: 75 mm
   object point of reference light: ∞
   aspherical surface coefficients: $0.11e^{-3}$, $-0.20e^{-4}$, $0.11e^{-4}$, $-0.55e^{-5}$, $-0.17e^{-5}$, $-0.18e^{-6}$ and $-0.21e^{-7}$ criteria for objective lens 27
   thickness at center: 2.85 mm
   refractive index: 1.515
   curvature radius of the light-receiving plane: 2.14 mm
   cone constant of the light-receiving plane: −0.16568
   aspherical surface coefficients of the light-receiving plane: $-0.62e^{-2}$, $-0.23e^{-2}$, $-0.47e^{-3}$ and $0.49e^{-4}$
   curvature radius of the light-emitting plane: −6.56 mm
   cone constant of the light-emitting plane: 13.22
   aspherical surface coefficients of the light-emitting plane: $-0.22e^{-1}$, $0.19e^{-1}$, $0.43e^{-2}$, and $0.27e^{-2}$ Further, in the present invention, the distance between the hologram lens and objective lens is 5.11 mm, with the objective lens being positioned such that it is 1.36 mm from a loaded 0.6 mm disk and 1.60 mm from a loaded 1.2 mm disk.

Figure 7:
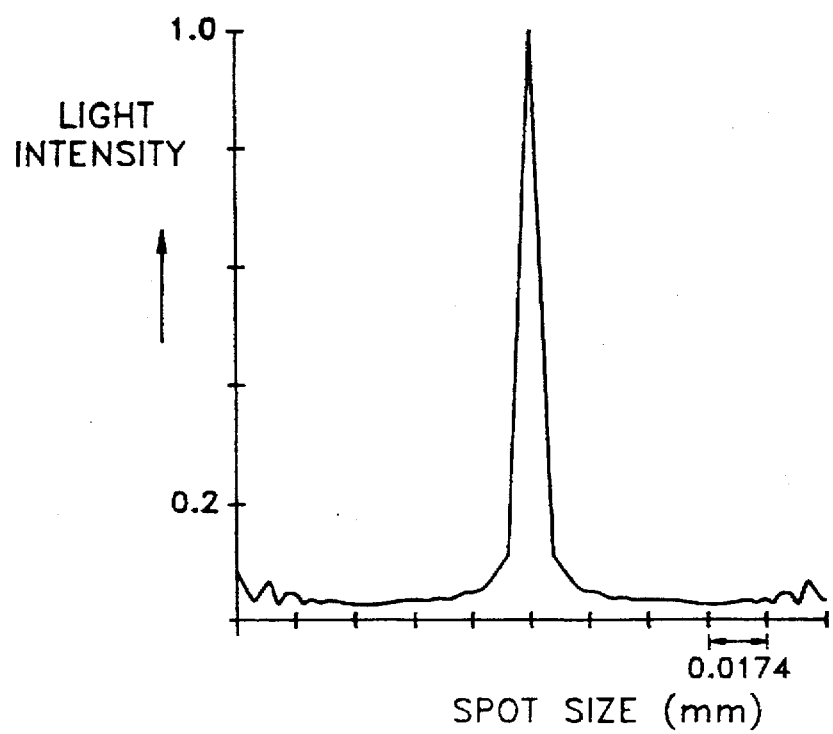
FIGS. 7 and 8 are profiles showing the size of the light spots formed according to the present invention and the distributions of light intensities thereof, for 0.6 mm and 1.2 mm disks, respectively.
Figure 8:
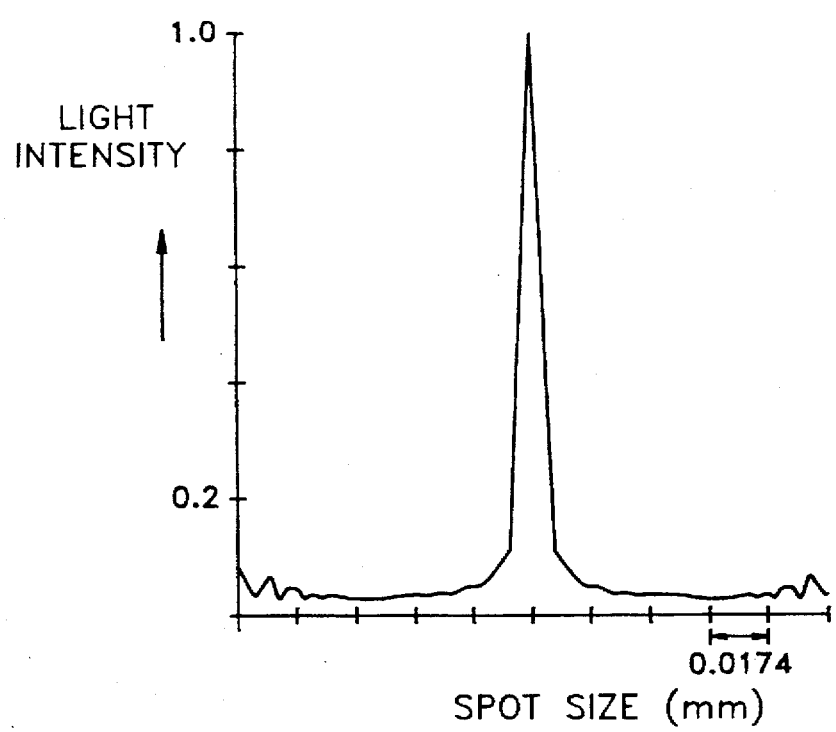

FIGS. 7 and 8 show the test results obtained by adopting the above lens data, for 0.6 mm and 1.2 mm disks, respectively. Here, the abscissas indicate the size of the focused light spots and the ordinates indicate light intensity.

As described above, in the dual-focus optical pickup according to the present invention, since the +1st order and −1st order diffracted light beams of a hologram lens are utilized at the same time, the light efficiency is not lowered; and since a simplified protrusion- and depression-shaped hologram pattern is used, the device is easy to manufacture and assemble. Further, the device is not sensitive to optical axis variations, which contributes to stable operation.

What is claimed is:

1. A dual-focus optical pickup, having means for detecting a signal corresponding to light reflected from two loaded disks having different thicknesses, for forming two light spots, with each light spot focused on its corresponding disk, said pickup comprising:
   a light source for generating light;
   a hologram lens for diffracting said generated light into +1st order light beams simultaneously; and
   an objective lens for focusing said +1st order light beams from said hologram lens onto either disk.

2. A dual-focus optical pickup as claimed in claim 1, wherein said hologram lens is protrusion-and depression-shaped.

3. A dual-focus optical pickup as claimed in claim 1, wherein, with respect to both 0.6 mm and 1.2 mm disks, said hologram lens has a thickness of 1 mm, a refractive index of 1.515, a hologram objective point of −75 mm, aspherical surface coefficients of $0.11e^{-3}$, $0.20e^{-4}$, $0.11e^{-4}$, $0.55e^{-5}$, $0.17e^{-5}$, $0.18e^{-6}$ and $0.21e^{-7}$, and an infinite reference light object point, and said objective lens has a center thickness of 2.85 mm, a refractive index of 1.515, a light-receiving-plane curvature radius of 2.14 mm, a light-receiving-plane cone constant of 0.16568, light-receiving-plane aspherical surface coefficients of $0.62e^{-2}$, $0.23e^{-2}$, $0.47e^{-3}$ and $0.49e^{-4}$, a light-emitting-plane curvature radius of 6.56 mm, a light-emitting-plane cone constant of 13.22, and light-emitting-plane aspherical surface coefficients of $0.22e^{-1}$, $0.19e^{-1}$, $0.43e^{-2}$ and $0.27e^{-2}$, and is positioned so as to be 1.36 mm from a loaded 0.6 mm disk and 1.60 mm from a loaded 1.2 mm disk, and wherein the distance between said lenses is 5.11 mm.

* * * * *